United States Patent [19]

Mohr

[11] Patent Number: 5,112,478
[45] Date of Patent: May 12, 1992

[54] FUEL FILTER FOR PREVENTING WATER AND PARTICULATE CONTAMINATION

[75] Inventor: Kirby S. Mohr, Jenks, Okla.

[73] Assignee: Facet Quantek, Inc., Tulsa, Okla.

[21] Appl. No.: 657,080

[22] Filed: Feb. 19, 1991

[51] Int. Cl.$^5$ ............................................. B01D 27/10
[52] U.S. Cl. ..................................... 210/96.1; 210/11; 210/430; 210/489; 210/502.1; 137/68.1
[58] Field of Search ............... 210/109, 430, 111, 96.1, 210/489, 502.1; 137/68.1

[56] References Cited

U.S. PATENT DOCUMENTS 3,339,734  9/1967  Kasten .................................. 137/68.1

*Primary Examiner*—W. Gary Jones
*Assistant Examiner*—Matthew O. Savage
*Attorney, Agent, or Firm*—Head and Johnson

[57] ABSTRACT

A fuel filter for preventing water and particulate contamination from passing therethrough, the filter having a rigid tubular fuel previous member having a first end and a second end, a flexible filter media surrounding the tubular member through which fuel freely passes from the exterior thereof into the tubular member but which resists the passage of particulate matter and water, a first end cap secured to the tubular member first end having an integral projectile portion extending within the tubular member direction toward the tubular member second end, the projectile portion being severable from the first end cap when differential fuel pressure thereacross reaches a preselected level, and, when severed, a passageway is formed through the first end cap, a second end cap secured to the tubular member second end having a passageway therethrough and having an annular seating surface, the projectile portion being configured to, when severed from the first end cap, engage and close against the annular surface of the second end cap to block further fuel flow through the filter.

12 Claims, 3 Drawing Sheets

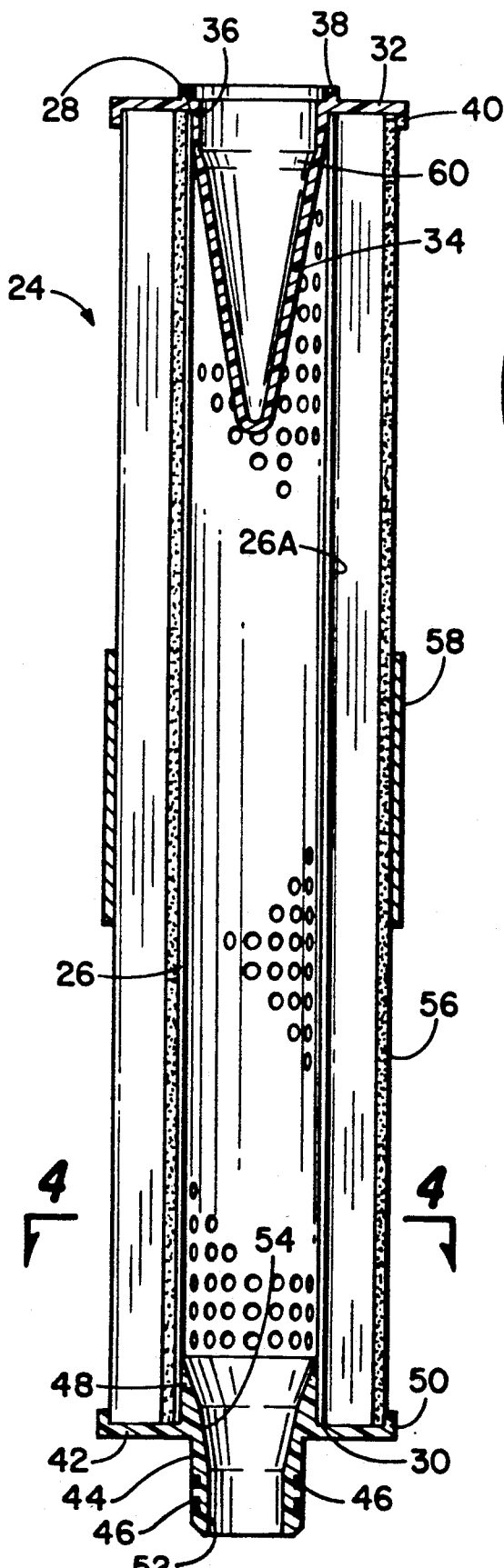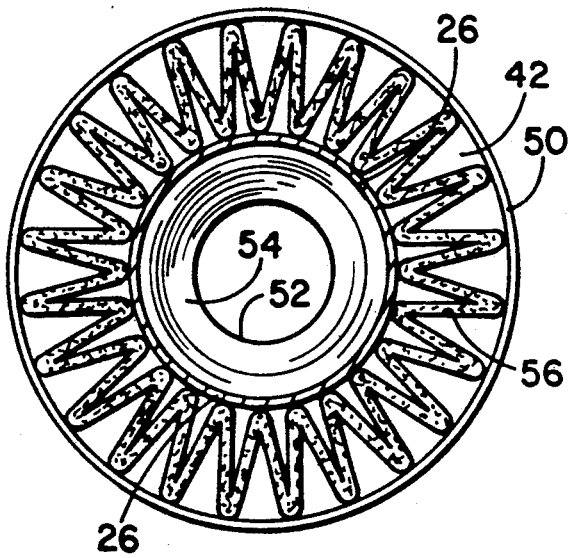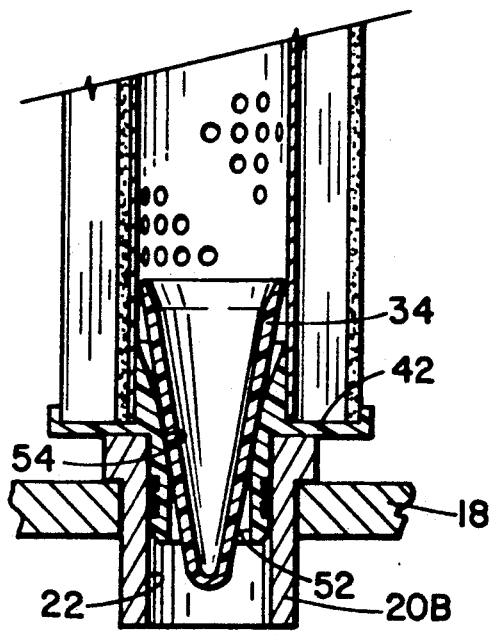
Fig. 3
Fig. 4
Fig. 5

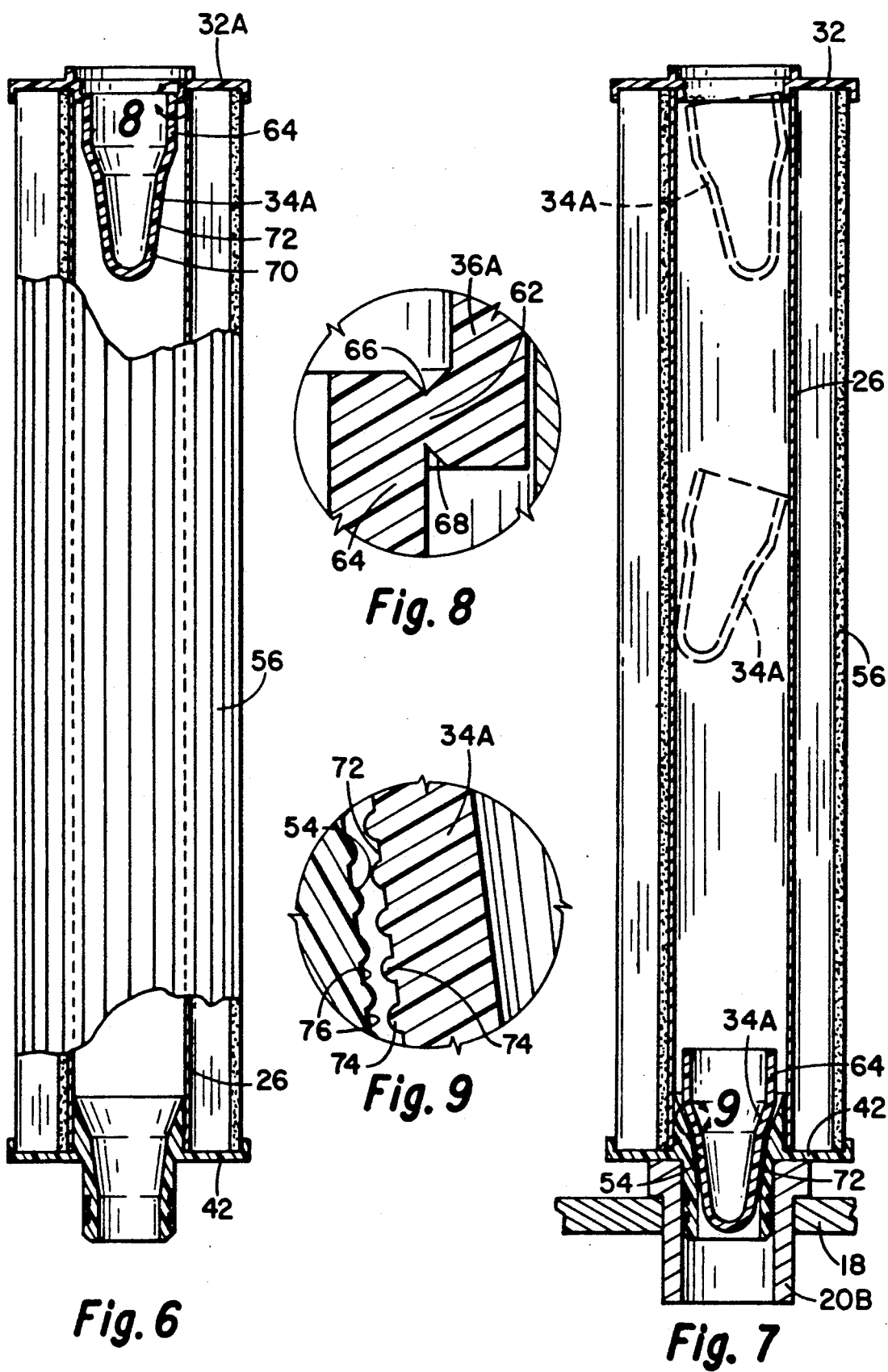

FUEL FILTER FOR PREVENTING WATER AND PARTICULATE CONTAMINATION

BACKGROUND OF THE DISCLOSURE

Fuel, such as gasoline, diesel fuel and the like, is severely impaired if water or particulate matter is admixed with it. Most fuel, such as gasoline, diesel fuel and so forth, as used in internal combustion engines is seriously effected by the presence of water. First, of course, water is not combustible and therefore subtracts from the energy value available from a given quantity of fluid. Second, water freezes easily and can block fuel lines in cold environments. Third, water tends to carry with it contaminates and more readily reacts with metals to form rust. For these and other reasons, it is very important that in order to preserve high fuel quality, water must be prevented from traveling in a fuel flow system.

One method to intercept water in a fuel system is to provide a fuel filter media of the type that permits fuel, such as gasoline, diesel fuel or the like, to pass therethrough, but which resists the passage of water. Filters of this type include hydrophilic material that absorbs and expands in the presence of water, but which are not olephilic, that is, that do not absorb hydrocarbons.

In a fuel flow filtering system it is highly desirable that positive shut off be provided so that when sufficient water is detected in a fuel flow system, such as by water absorptive fuel media swelling or otherwise reacting to resist the further fuel flow therethrough, a positive mechanical type shut off is obtained. U.S. Pat. No. 4,485,011 to Cole et al discloses a type of shut-off valve in conjunction with a fuel filter arrangement. Reference may also be had to U.S. Pat. No. 4,959,141 to Anderson which discloses an improvement in the Cole et al device. In the Cole et al and Anderson devices, a ball is maintained in position when the pressure drop across a filter media is below a certain level but is displaced when the pressure drop increases, such as occurs when the filter absorbs water. The ball is then passed to a valve closure position to stop further fuel flow through the filter. The concepts of the Cole et al U.S. Pat. No. 4,485,011 and Anderson U.S. Pat. No. 4,959,141 are good and useful and are significant advancements of the state of the art. However, some problems exist with the critical manufacturing tolerances employed in both the Cole et al and Anderson devices. The devices disclosed in each of these patents include one or more washer-type elements that are deformed by a ball as pressure differential across the ball increases. It can be easily understood that the thickness of the washer, the diameter of the opening through the washer, the diameter of the ball, the deflection of the washer in the manufacture process, and so forth, are exceedingly critical to permit the ball to pass through the washer or washers at the proper elevated pressure differential, but which do not permit the ball to pass through at lower pressure differentials. While the concepts of the Cole et al and Anderson patents are good, manufacturing products to fulfill the objectives of these patents has proven to be somewhat difficult.

The present disclosure is an improvement in the basic concepts disclosed in the Cole et al and Anderson patents. Particularly, the present disclosure is intended to accomplish essentially the same objective of these two previously issued patents, that is, to close off fuel flow through a filter when the amount of water and contaminants absorbed by the filter has caused a differential pressure to build across the filter to a preselected level and to thereafter stop all further fuel flow through the filter.

The present disclosure accomplishes essentially the same objectives of the Cole et al and Anderson patents without using a ball and washer arrangement, and in a way that permits more carefully controllable manufacturing tolerances to thereby provide for a fuel filter having a method of fuel cut off that is easier to manufacture and a filter having a more predictable level of differential pressure that actuates the filter to close off against further fuel flow.

SUMMARY OF THE DISCLOSURE

This disclosure relates to a fuel filter having means for preventing water and particulate contaminates from passing through the filter. The filter is particularly applicable for use in fuel handling systems, such as in service stations wherein the filter can be inserted between a gasoline storage tank, usually underground, and fuel dispensing pumps. The filter is also applicable for use in aviation fuel handling systems, and the principles of this invention may be employed in fuel filters attached directly to service station fuel outlets.

The filter is formed by a rigid tubular fuel pervious member. Such member can be formed of perforated aluminum tubing or perforated plastic tubing. Various other kinds of metals and a variety of plastics may be employed for forming the tubular member.

Wrapped on the external cylindrical surface of the tubular member is flexible filter media of the type that allows fuel to freely pass therethrough, but that resists the passage of particulate matter and water. The filter media is preferably formed in a pleated configuration and secured on the exterior surface of the tubular member. The pleated configuration provides a greatly increased cross-sectional area for the flow of fuel therethrough.

A first end cap is secured to one end of the tubular member and has an integral projectile portion extending within the tubular member and in the direction towards the tubular member other end.

A second end cap is secured to the tubular member other end and has a passageway therethrough that communicates with the interior of the tubular member. The passageway in the second end cap includes an internal annular seating surface.

The fuel filter is typically mounted within a vessel. Fuel is delivered into the interior of the vessel external of the filter, the fuel flowing through the filter media into the tubular member and out a passageway in the second end cap. The vessel includes an arrangement to conduct the fuel flow from the second end cap passageway to the exterior of the vessel. In this manner, water and entrained solid particulate matter are intercepted by the filter media, and clean fuel, substantially free of water and particulate matter, flows out through the second end cap passageway.

As the filter media absorbs water it becomes increasingly impervious to the passage of fuel. After sufficient water has been absorbed by the filter media, the pressure differential builds as increased pressure is required to force fuel through the filter media.

A projectile portion is integrally formed with the first end cap and is severable from the end cap. By "severable" is meant that the projectile portion is configured to separate from the first end cap when sufficient differential pressure is applied across the end cap. Severability of the projectile portion can be achieved by providing an annular area of reduced thickness of the material of which the end cap is formed. In the preferred embodiment, the first end cap is molded of plastic material. The projectile portion preferably has a short length tubular base portion, one end of which is integrally affixed to the first end cap. An annular reduced thickness groove formed in the material of which the end cap is made surrounding the projectile tubular base portion provides an area of severability of the projectile portion.

The projectile portion has an integral nose that is frusto-conical in shape providing, on the exterior surface of the projectile portion, a conically configured annular seating surface.

When the filter media has absorbed sufficient water or particulate matter so that the pressure drop required to force fuel through the filter media increases to a preselected level, the projectile portion is severed from the first end cap. The flow of fuel propels the projectile portion in the direction toward the second end cap and causes the projectile portion to seat in the annular seating area of the second end cap, closing the filter against further fuel flow.

In one embodiment, the projectile portion is integrally affixed to the first end cap by an annular radial portion surrounding the end cap base tubular portion, the radial portion being integrally affixed at its outer edge to the end cap. The radial annular portion has a circumferential groove therein providing an area of weakness at which the projectile portion is severed from the end cap when sufficient differential pressure exists. A first and a second opposed annular groove may be formed in the annular radial portion as a means of concentrating the area of severability.

When the projectile portion is severed from the first end cap, an annular opening is provided in the first end cap for the rapid flow of fuel therethrough. This rapid flow forces the projectile portion into seating contact with the annular seat in the second end cap. It is desirable that once such event has occured that the projectile portion remains in seated engagement with the second end cap. This is accomplished by providing at least one, but preferably a plurality, of spaced apart circumferential ridges on the projectile seating surface and mating circumferential recesses in the second end cap annular seat. The projectile portion is thereby locked in seated position in the second end cap after it has been severed from the first end cap so that it does not inadvertently drift away during periods when little pressure differential occurs and which would otherwise prevent the projectile from moving away from its flow closure position.

A better understanding of the invention will be had by reference to the following description and claims, taken in conjunction with the attached drawings.

DESCRIPTION OF THE DRAWINGS

FIG. 3 is a cross-sectional view taken along the line 3—3 of FIG. 1 showing the internal arrangement of one embodiment of the filter.

FIG. 4 is a cross-sectional view taken along the line 4—4 of FIG. 3 showing the pleated filter media as may be used in practicing the invention.

FIG. 5 is a fragmentary elevational cross-sectional view of the lower portion of the filter element showing the projectile portion of the first end cap in seating position in the annular seat in the second end cap.

FIG. 6 is an external elevational view of an alternate embodiment of the filter, the upper and lower portions being shown in cross-section.

FIG. 7 is a cross-sectional elevational view as in FIG. 6 showing in dotted outline the projectile portion as it breaks away from the first end cap in response to differential pressure thereacross and showing in solid outline the projectile portion in seating position in the second end cap.

FIG. 8 is an enlarged fragmentary view taken at 8 of FIG. 6 showing details of the use of annular grooves to provide areas of severability of the projectile portion from the first end cap.

FIG. 9 is an enlarged fragmentary view taken at 9 of FIG. 7 showing the use of ridges and grooves on the external surface of the projectile portion and in the annular seating area of the second end cap as a means of locking the projectile portion in closed position after it has encountered the second end cap.

DESCRIPTION OF THE PREFERRED EMBODIMENTS

Figure 1:
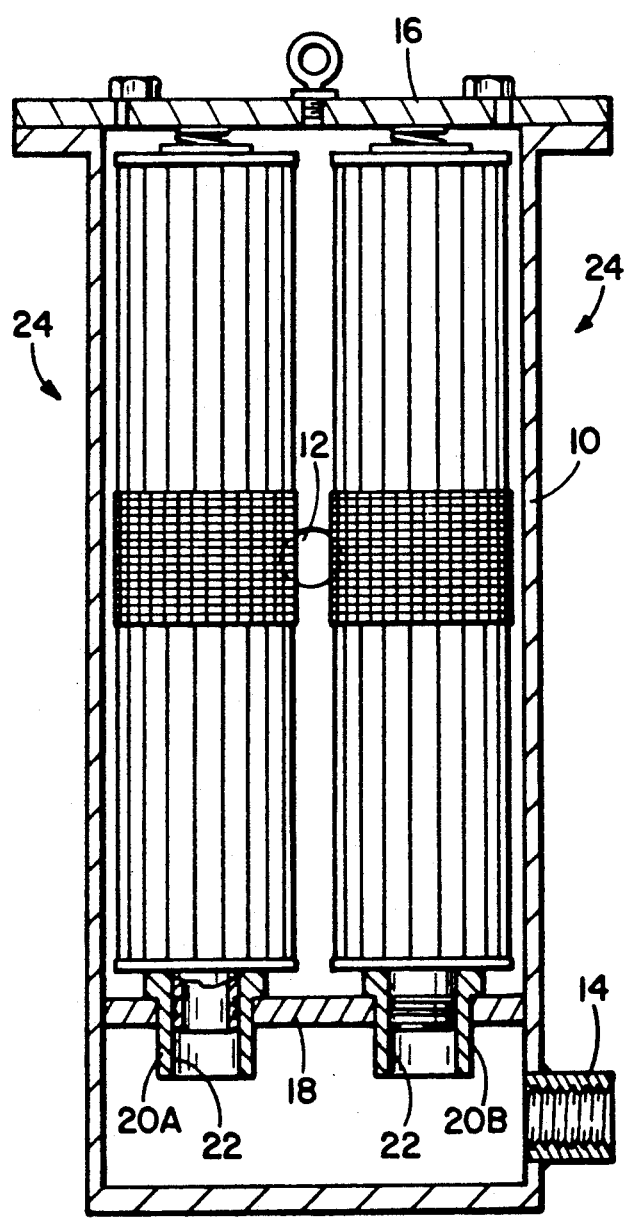
FIG. 1 is an elevational cross-sectional view of a typical vessel in which the fuel filter of this disclosure may be employed. The vessel of FIG. 1 shows the use of two fuel filters in tandem, and the vessel is of the type that may be employed for filtering fuel from an underground storage tank at a service station location. The fuel is pumped from an underground storage tank, through the filter and into a dispensing unit where the fuel is metered and passed into a hose for discharge into a vehicle gasoline tank.

Referring to the drawings and first to FIG. 1, a filtration vessel 10 is shown in cross-section having a fuel inlet 12 and a fuel outlet 14. The vessel has a cover plate 16 by which filter elements can be inserted into or removed from the vessel. Further, the filtration vessel has a support plate 18 with collar members 20A and 20B therein. The collar members have internal cylindrical surfaces 22.

Received within vessel 10 are two identical filter elements 24. This disclosure is related to filter elements 24. Vessel 10 and components 12 through 22 are not a part of this disclosure but are presented as background material only as illustrative of a typical environment in which the filter element 24 of this disclosure is employed. The vessel 10 may be of a variety of shapes, sizes and configurations, and filter element 24 may also be of different sizes, shapes and configurations while maintaining the principles of this disclosure, which will now be described in greater detail.

Figure 2:
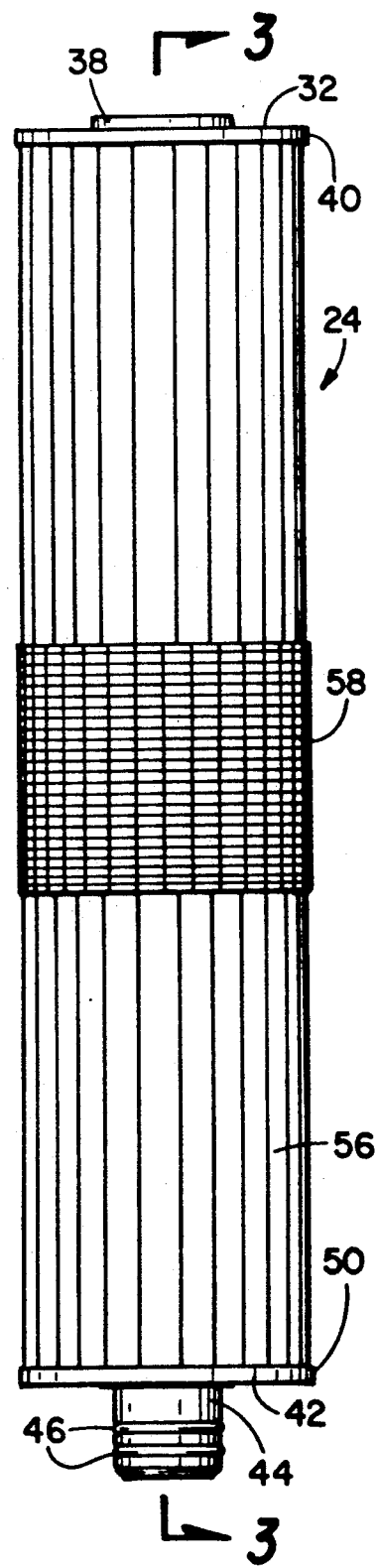
FIG. 2 is an enlarged elevational external view of a typical filter employing the principles of this invention.

In the external view of FIG. 2 and the cross-sectional views of FIGS. 3 and 4, the components making up the filter element 24 are seen. A rigid tubular fuel pervious member 26 is formed of perforated metal or plastic. The tubular member may also be formed of other metals, or of plastic, fiberglass and so forth.

Tubular member 26 has a first end 28 and a second end 30.

Affixed to the tubular member first end is a first end cap 32. End cap 32 is preferably molded of plastic and has an integral projectile portion 34. The end cap 32 of FIG. 3 is basically a radial flat member having an internal short length integral tubular portion 36 that is received within tubular member 26 at the upper end 28 thereof. The projectile portion 34 is integrally formed at the lower end of tubular portion 36.

The first end cap is further defined by a short length upwardly extending annular ridge 38 and a downwardly extending outer annular short length tubular portion 40.

Secured to the tubular member 26 lower end 30 is a second end cap 42. Second end cap 42 is preferably molded of plastic and is essentially a radial portion having an outwardly extending integral tubular portion 44 that has grooves therein receiving O-rings 46.

The second end cap 42 is further defined by an upwardly or inwardly extending integral tubular portion 48 that is received within perforated tubular member 26, and by an outer circumferential upwardly extending flange portion 50. The outer tubular portion 44 and inner tubular portion 48 provide a passageway 52 therethrough. A portion of the passageway 52 is configured to provide an annular seating surface 54.

Received upon the exterior cylindrical surface 26A of the perforated tubular member 26 is a flexible filter media 56. The filter media may be of a variety of types and configurations, however, a preferred arrangement is the use of a pleated media, as shown in FIG. 4, the pleating of the media serving to greatly increase the cross-sectional area through which fuel may flow. The upper and lower ends of the filter media are secured to first end cap 32 and second end cap 42 respectively.

The filter media 56 is of the type that freely permits the flow of hydrocarbon fuel therethrough, but that intercepts solid particulate matter and water. The method of interception of water varies with different kinds of filter media. One type of water absorbing filter media is illustrated and described in detail in U.S. Pat. No. 4,787,949 which is incorporated herein by reference. This type of filter media includes material that reacts with water to swell and make the filter media substantially impervious to additional fluid flow therethrough.

A reinforcing band 58, typically formed of netting of high tensile plastic materials, is positioned around the exterior of filter media 56. The function of band 58 is to prevent outward swelling of the material. The reinforcing band is not relevant to the features of this disclosure and such is commonly employed in the filtration art.

When the filter of FIGS. 2, 3 and 4 is employed, such as, by example, in a vessel 10 as shown in FIG. 1, fuel flows radially inwardly through filter media 56, into perforated tubular member 26 and out through passageway 52 in the second end cap 42. The filter media 56 serves to intercept particulate matter and any water entrained in the fuel is absorbed in the filter media so that thereby fuel passing through filter 24 is substantially free of water and particulate matter.

As filter media 56 absorbs particulate matter and water, the resistance to the passage of fuel through the filter increases and accordingly a pressure drop builds up across the filter media— that is, a pressure differential is created between the exterior of the filter element and the interior of the perforated tubular member 26. This pressure differential is applied across end cap 32 and to the end cap projectile portion 34.

As illustrated in FIG. 3, there is, where the projectile portion 34 is integrally affixed to the end cap inner tubular portion 36, a circumferential groove 60. Groove 60 is an area of decreased thickness of the plastic material forming the end cap and represents an area of severability of projectile portion 34 from the end cap tubular portion 36.

As the differential pressure across the end cap increases, a point is reached where the tensile force applied to the circumferential groove 60 causes the projectile portion 34 to sever from the end cap. When separation of projectile portion occurs fuel can immediately and rapidly flow through the first end cap 32. This immediate and rapid fuel flow forces projectile portion 34 to move quickly toward second end cap 42 where, as shown in FIG. 5, the severed projectile portion 34 seats within the second end cap annular seating surface 54 thereby closing further fuel flow through annular passageway 52.

When the projectile portion 34 seats within the second end cap closing fuel flow, the operability of the filter element is terminated, causing the operator to replace the filter element. In this way the filter element cannot continue to be used after it has absorbed a quantity of water and particulate matter that has increased the resistance of flow of fuel through a filter to a preselected pressure requirement.

FIGS. 6 through 9 show an alternate embodiment of the invention. In this embodiment, first end cap 32A is constructed differently than that of the first embodiment described. As shown in FIG. 8, the molded first end cap 32A has a short length integral tubular portion 36A and a radial annular integral flange portion 62. The projectile portion 34A has an integral generally tubular base portion 64. The projectile member is integrally affixed to the end cap by the radial flange portion 62.

An area of severability of the projectile portion from the end cap is provided by annular grooves 66 and 68 formed in radial flange portion 62. The grooves 66 and 68 are opposed to each other and provide a selected annular area of predetermined thickness of material that integrally connects the projectile tubular base portion 64 to the end cap inner tubular portion 36A. When sufficient differential pressure builds across the end cap in the manner as previously described, the projectile portion is severed from the end cap at the radial flange portion 62 in the area between the opposed annular grooves 66 and 68. It can be seen that the area of severability can be obtained in a variety of ways. Only one annular groove 66 may be employed or the annular flange portion 62 may be of preselected thickness to obtain the desired severability without the use of either one of the annular grooves 66 or 68.

The projectile portion 34A of FIGS. 6 and 7 is configured to have an integral nose portion 70 affixed to tubular base portion 64. The nose portion being defined, at least in part, by a frusto-conical portion providing an external annular seating surface 72. As shown in FIG. 7, when the projectile portion 34A breaks away from first end cap 32A it moves downwardly within perforated tubular member 26 so that the projectile annular seating surface 72 seats against the second end cap annular seating surface 54 to close further fuel flow through the filter.

It is desirable that once the projectile has been severed from the first end cap and seated within the annular passageway in the second end cap that the projectile be retained in such position so that it cannot inadvertently be moved out of position if pressure differential across the projectile is, for any reason, interrupted. To achieve this action the taper of the conical external surface of the projectile portion 34 and the taper of annular seating surface 54 can be matched to provide self locking action. With a matching taper of both of these surfaces of about 7° relative to their conical axii, the projectile 34 once forced into seating surface 54 will resist displacement. That is, the projectile can be dimensioned to be "self-locking".

Another method of reducing the possibility of the projectile portion becoming dislodged from its seated position in annular seating surface 54 is illustrated in FIG. 9. The projectile annular seating surface 72 is provided with a plurality of spaced apart integral enlarged diameter circumferential ridges 74 and annular grooves 76. Mating circumferential annular grooves 76 and circumferential ridges 74 are provided in the annular seating surface 54 of the second end cap. These ridges 74 and grooves 76 are illustrated in FIG. 9. While in the preferred arrangement the use of a plurality of ridges 74 and mating grooves 76 is illustrated, the concept can be practiced wherein at least one ridge and one groove are employed. The concept may also be practiced when the taper of the conical external surface of the projectile portion 34 and the annular seating surface 54 are matched to provide the self-locking action as described previously. When the projectile portion 34A seats against the second end cap, the grooves and ridges interlock to retain the projectile in place in seated position, terminating fuel flow through the filter.

The fuel filter having means of preventing water and particulate contaminants from passing therethrough as herein described provides improved control over the preselected pressure drop required to close the filter against further fuel flow.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A fuel filter having means of preventing water and particulate contaminant from passing therethrough, comprising:
    a rigid tubular fuel pervious member having a first end and a second end;
    flexible filter media surrounding said tubular member through which fuel freely passes from the exterior thereof into said tubular member but which resists the passage of particulate matter and water;
    a first end cap secured to said tubular member first end having a projectile portion extending within said tubular member and in the direction towards said tubular member second end, the projectile portion being severable from the first end cap when the differential fuel pressure thereacross reaches a preselected level, and, when severed, opens a passageway through the first end cap communicating with the interior of said tubular members;
    a second end cap secured to said tubular member second end having a passageway therethrough in communication with the interior of said tubular member and having an annular seating surface therein, said projectile portion being configured to, when severed from said first end cap, engage and close against said annular seating surface to block further fuel flow through the filter; and
    wherein one of said projectile portion and said annular seating surface has at least one large diameter circumferential ridge thereon and the other of said projectile portion and said annular seating surface has at least one mating circumferential annular groove therein whereby upon engagement therewith said projectile portion is locked to said seating surface.

2. A fuel filter according to claim 1 wherein said first end cap and said projectile portion being affixed to said end cap by an annular integral connecting portion of reduced cross-sectional thickness.

3. A fuel filter according to claim 2 wherein said projectile portion is defined in part by an annular base portion and wherein said first end cap is defined in part by an annular portion of larger diameter than said annular base portion, said annular base portion and said annular portion being integrally connected by an annular radial portion having an annular area of reduced thickness by which said projectile portion is severable from said first end cap in response to increased fluid pressure across said first end cap.

4. A fuel filter according to claim 3 wherein said projectile portion is further defined by a forward closed nose portion integrally affixed to said annular base portion and having an annular seat forming portion sealably engageable with said second end cap annular seat when said projectile portion is severed from said first end cap.

5. A fuel filter according to claim 1 wherein said means to lock said projectile portion in said second end cap annular seating surface includes the arrangement wherein said nose portion has an external conical seating surface and wherein said annular seating surface is conical, and wherein both said external conical seating surface and said annular seating surface have a common selected angle relative to their conical axii that causes the nose portion and the annular seating surface to be further self locking.

6. A fuel filter according to claim 5 wherein said common angle relative to the conical axii of said external conical seating surface and said annular seating surface is about 7°.

7. A fuel filter having means of preventing water and particulate contaminant from passing therethrough, comprising:
    a rigid tubular fuel pervious member having a first end and a second end;
    flexible filter media surrounding said tubular member through which fuel freely passes from the exterior thereof into said tubular member but which resists the passage of particulate matter and water;
    a first end cap secured to said tubular member first end having a projectile portion extending within said tubular member and in the direction towards said tubular member second end, the projectile portion being severable from the first end cap when the differential fuel pressure thereacross reaches a preselected level, and, when severed, opens a passageway through the first end cap communicating with the interior of said tubular member;

a second end cap secured to said tubular member second end having a passageway therethrough in communication with the interior of said tubular member and having an annular seating surface therein, said projectile portion being configured to, when severed from said first end cap, engage and close against said annular seating surface to block further fuel flow through the filter; and wherein said projectile portion is defined in part by an annular tubular base portion formed of plastic and wherein said first end cap is defined in part by an annular tubular portion formed of plastic of larger diameter than said projectile annular tubular portion, said annular tubular base portion and said annular tubular portion being integrally connected by an annular radial portion formed of plastic having at least one annular groove therein providing an annular area of reduced thickness by which said projectile portion is severable from said first end cap in response to increased fluid pressure across said first end cap.

8. A fuel filter according to claim 7 wherein said projectile portion is further defined by a forward closed nose portion integrally affixed to said annular tubular base portion and having an annular seat forming portion sealably engageable with said second end cap annular seating surface when said projectile portion is severed from said first end cap.

9. A fuel filter according to claim 8 including:
means when said projectile portion is severed to lock said projectile portion in said second end cap annular seat.

10. A fuel filter according to claim 9 wherein said means to lock said projectile portion in said second end cap annular seat includes the arrangement wherein one of said projectile portion and said annular seating surface has at least one large diameter circumferential ridge thereon and the other of said projectile portion and said annular seating surface has at least one mating circumferential annular groove therein whereby upon engagement therewith said projectile portion is locked to said seating surface.

11. A fuel filter according to claim 10 wherein said means to lock said projectile portion in said second end cap annular seating surface includes the arrangement wherein said nose portion has an external conical seating surface and wherein said annular seating surface is conical, and wherein both said external conical seating surface and said annular seating surface have a common selected angle relative to their conical axii that causes the nose portion and the annular seating surface to be self locking.

12. A fuel filter according to claim 11 wherein said common angle relative to the conical axii of said external conical seating surface and said annular seating surface is about 7°.

* * * * *